(12) United States Patent
Tailor et al.

(10) Patent No.: US 8,160,628 B1
(45) Date of Patent: Apr. 17, 2012

(54) SYSTEM AND METHOD OF SETTING UP A PUSH-TO-TALK CALL

(75) Inventors: Pinal Tailor, Herndon, VA (US); Mohammad Ghaus, McLean, VA (US); Esmail Dinan, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 864 days.

(21) Appl. No.: 12/170,492

(22) Filed: Jul. 10, 2008

(51) Int. Cl.
*H04B 7/00* (2006.01)
*H04M 3/42* (2006.01)

(52) U.S. Cl. ......... 455/519; 455/517; 455/518; 455/416

(58) Field of Classification Search .................. 455/521, 455/416, 517–519
See application file for complete search history.

(56) References Cited

U.S. PATENT DOCUMENTS

| | | | | |
|---|---|---|---|---|
| 7,047,031 | B2 * | 5/2006 | Rosen et al. | 455/518 |
| 7,117,000 | B2 * | 10/2006 | Chen | 455/515 |
| 7,170,863 | B1 * | 1/2007 | Denman et al. | 370/260 |
| 7,190,981 | B2 * | 3/2007 | Cherian | 455/574 |
| 7,266,382 | B2 * | 9/2007 | Noel et al. | 455/518 |
| 7,603,126 | B2 * | 10/2009 | Rosen et al. | 455/452.1 |
| 7,751,842 | B2 * | 7/2010 | Sung et al. | 455/518 |
| 7,826,603 | B1 * | 11/2010 | Denman et al. | 379/202.01 |
| 7,890,129 | B2 * | 2/2011 | Rosen et al. | 455/518 |
| 7,904,103 | B2 * | 3/2011 | Sung et al. | 455/518 |
| 7,970,425 | B2 * | 6/2011 | Balachandran et al. | 455/519 |
| 2002/0037735 | A1 * | 3/2002 | Maggenti et al. | 455/517 |
| 2006/0116151 | A1 * | 6/2006 | Sullivan et al. | 455/519 |

* cited by examiner

*Primary Examiner* — Tilahun B Gesesse

(57) ABSTRACT

Systems and methods of setting up a push-to-talk call are provided. When a push-to-talk server receives a request for a push-to-talk call from an originating mobile station, the server sends a push-to-talk call notification to a destination mobile station identified in the request and starts a timer. Upon expiration of the timer the server determines whether the originating mobile station has a traffic channel for the push-to-talk call.

16 Claims, 8 Drawing Sheets

SYSTEM AND METHOD OF SETTING UP A PUSH-TO-TALK CALL

BACKGROUND OF THE INVENTION

Wireless communication networks typically provide a number of different services, such a voice and data communication services. Most wireless communication networks typically offer a single type of voice communication service, interconnect voice communication services (also referred to as circuit-switched voice communication services). Interconnect voice communication services provide a full-duplex communication between two communication endpoints.

Another type of voice communication service is push-to-talk voice communication service (also referred to as dispatch communication service), which involves a half-duplex communication between two communication endpoints. Thus, a push-to-talk call requires floor control to ensure that only one endpoint has permission to talk at any particular time during the call. There are three basic types of push-to-talk calls, call alerts, private calls and group calls. Call alerts merely inform the caller whether the called party is available for a call, but no voice channel is established. Private calls involve establishing a voice channel between two endpoints, whereas group calls involve establishing a voice channel between more than two endpoints.

Push-to-talk communication services have historically been employed in private wireless communication networks by, for example, taxi cab companies or emergency service agencies (e.g., police and fire departments). Until recently, the only type of public wireless communication network that supported push-to-talk calls was the iDEN network, such as the one owned and operated by Sprint Nextel Corporation.

One of the most recognized advantages of push-to-talk calls compared to interconnect calls is the fast call setup time. For example, push-to-talk calls are typically setup in under 1 second, whereas interconnect calls may not even begin to ring the called party in this time. Private wireless communication networks and the iDEN network are able to provide push-to-talk calls with a fast setup time because these networks are specifically designed to provide these types of calls. Moreover, due to the proprietary nature in which push-to-talk calls are implemented to satisfy this fast setup time, push-to-talk calls typically are not performed between different wireless communication networks.

SUMMARY OF THE INVENTION

Various techniques have been implemented in order to achieve a fast call setup for push-to-talk calls in wireless networks that are not originally designed to support such calls. These techniques are typically based upon assumptions on how a call will be setup, and when these assumptions do not hold true, the end-user experience can be degraded.

Systems and methods of setting up a push-to-talk call are provided. When a push-to-talk server receives a request for a push-to-talk call from an originating mobile station, the server sends a push-to-talk call notification to a destination mobile station identified in the request and starts a timer. Upon expiration of the timer the server determines whether the originating mobile station has a traffic channel for the push-to-talk call.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
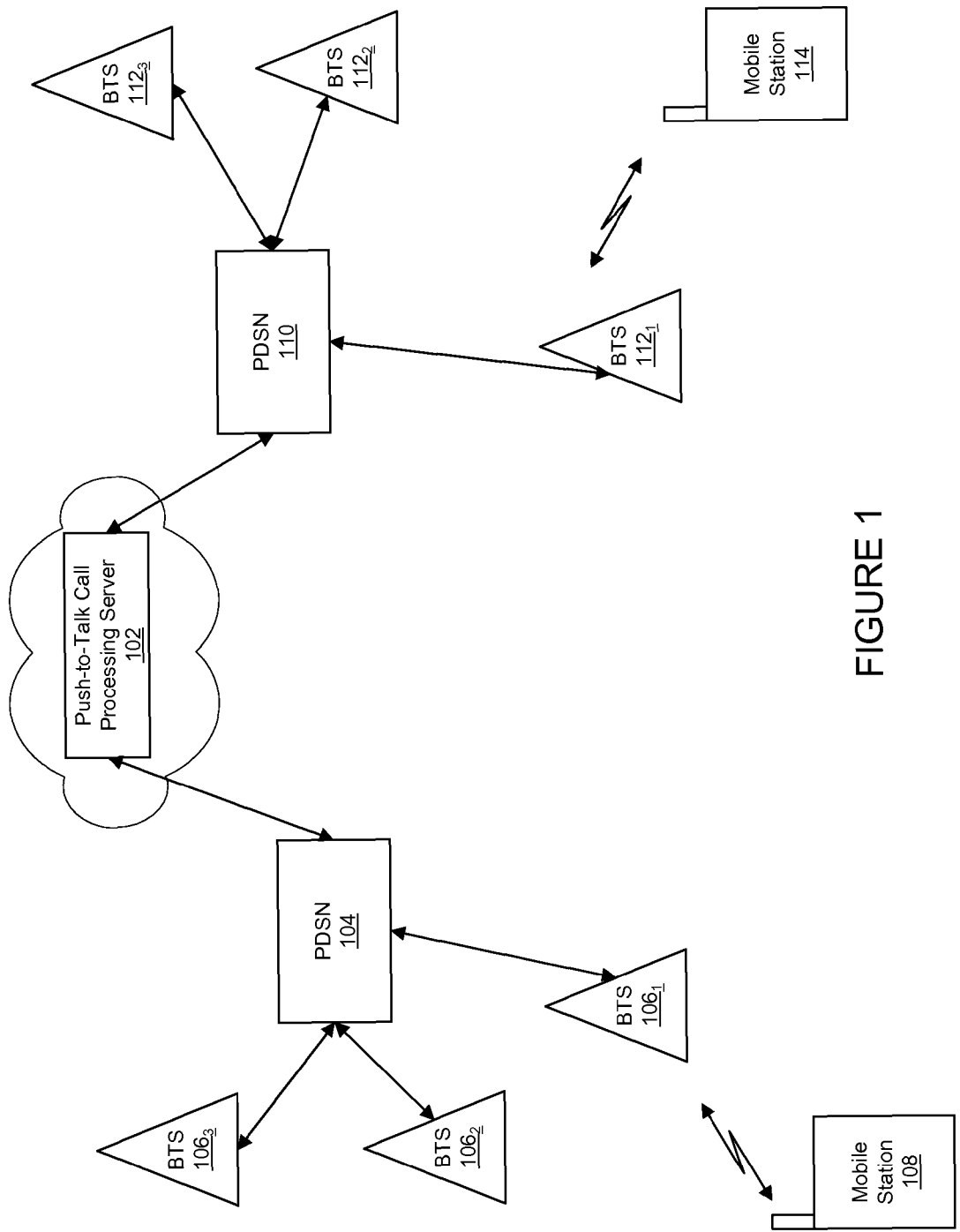
FIG. 1 is a block diagram of an exemplary system in accordance with the present invention

FIG. 1 is a block diagram of an exemplary system in accordance with the present invention. An exemplary system includes a push-to-talk call processing server 102 coupled to a plurality of base transceiver stations (BTS) 106$_1$-106$_3$ and 112$_1$-112$_3$ by way of packet data service nodes (PDSNs) 104 and 110. Accordingly, an originating mobile station 108 can establish a push-to-talk call with a destination mobile station 114 by way of BTS 106$_1$, PDSN 104, push-to-talk call processing server 102, PDSN 110 and BTS 112$_1$. Although FIG. 1 illustrates a particular number of BTSs, PDSNs and mobile stations, the present invention can be employed with more or less of any of these components.

Figure 2:
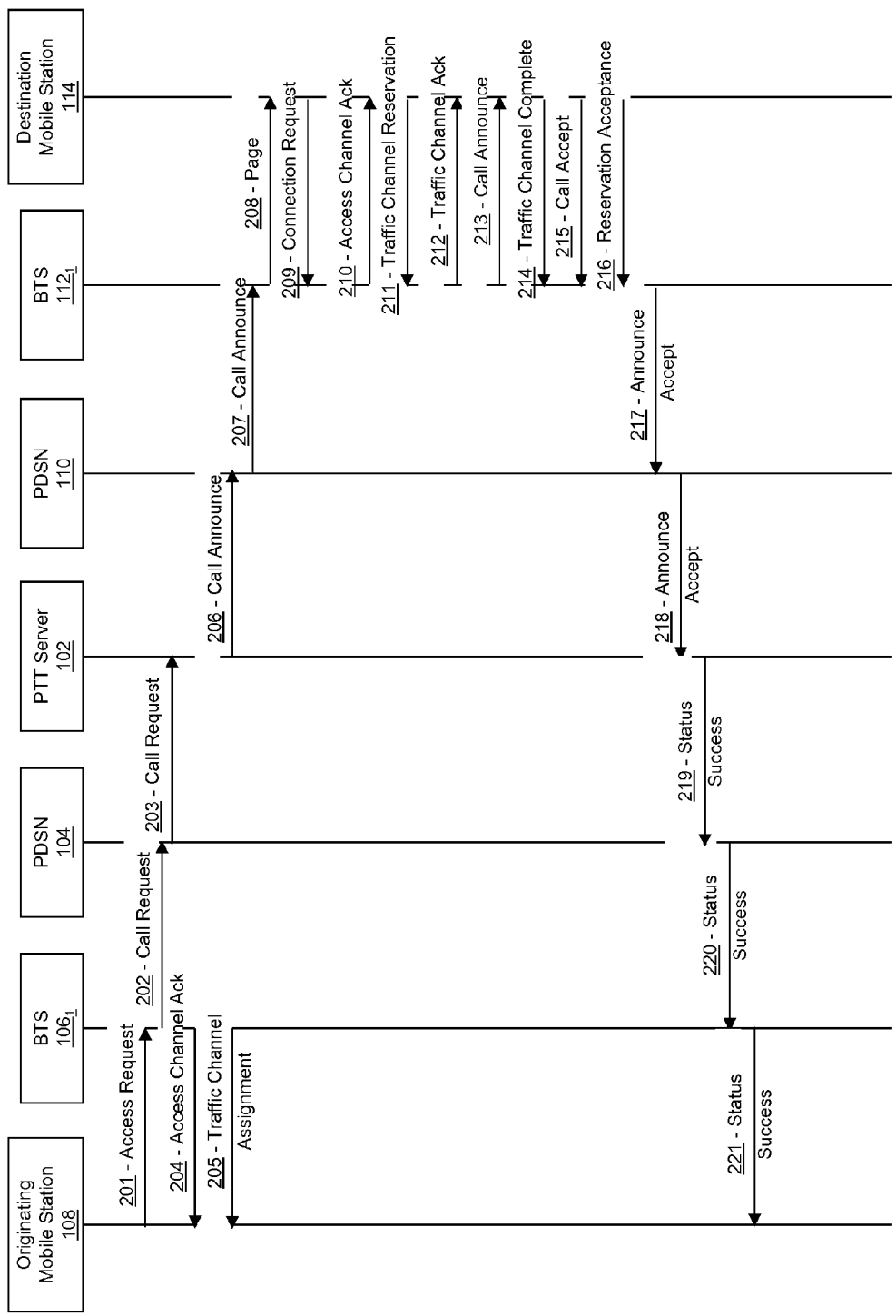
FIG. 2 is a conventional call flow diagram of a successful push-to-talk call.

FIG. 2 is a conventional call flow diagram of a successful push-to-talk call. When origination mobile station 108 desires to establish a push-to-talk call with destination mobile station 114, the originating mobile station sends an access request message to BTS 106$_1$ (step 201). The access request can include a connection request (CR), route update request (RUM) and reservation request, and can be sent on an access channel. BTS 106$_1$ then sends a call request to PDSN 104 (step 202), which then sends a call request to PTT server 102 (step 203). BTS 106$_1$ also sends an access channel acknowledgement and traffic channel assignment message over a control channel (steps 204 and 205).

In response to receiving the call request message, PTT server 102 sends a call announce message to PDSN 110 (step 206), which forwards the call announce message to the BTS supporting the destination mobile station (step 207). BTS 112$_1$ then attempts to establish a traffic channel with destination mobile station 114 in steps 208-216. Specifically, BTS 112$_1$ sends a page to destination mobile station 114 (step 208), which responds with a connection request message (step 209). BTS 112$_1$ sends an access channel acknowledgement message to destination mobile station 114 (step 210), which then responds with a traffic channel reservation request message (step 211). BTS 112$_1$ sends a traffic channel acknowledgement message over a control channel (step 212), and also a call announce message (step 213), which identifies that an incoming PTT call is being set up. Destination mobile station 114 responds with traffic channel complete, call accept and reservation acceptance messages (step 214-216).

In response to the acceptance of the call by destination mobile station 114, BTS 112$_1$ sends an announce accept message to PDSN 110 (step 217), which forwards a message to PTT server 102 (step 218). PTT server 102 sends a status success message to PDSN 104 (step 219), which forwards the message to BTS 106₁ (step 220). BTS 106₁ sends the status success message to the originating mobile station 108 (step 221), which then completes the processing for successfully setting up a push-to-talk call.

Figure 3A:
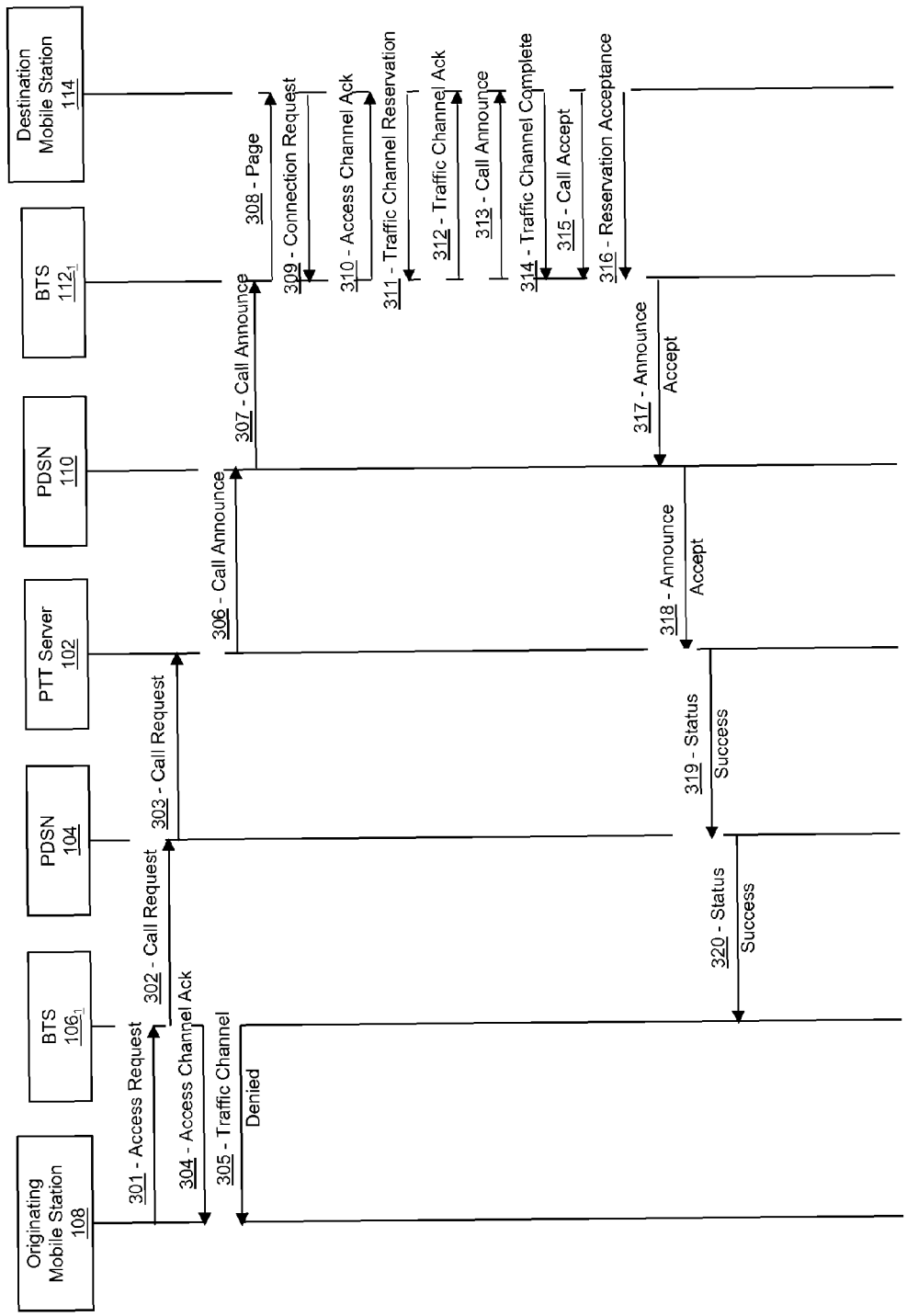
FIGS. 3A and 3B are conventional call flow diagrams of an unsuccessful push-to-talk call.
Figure 3B:
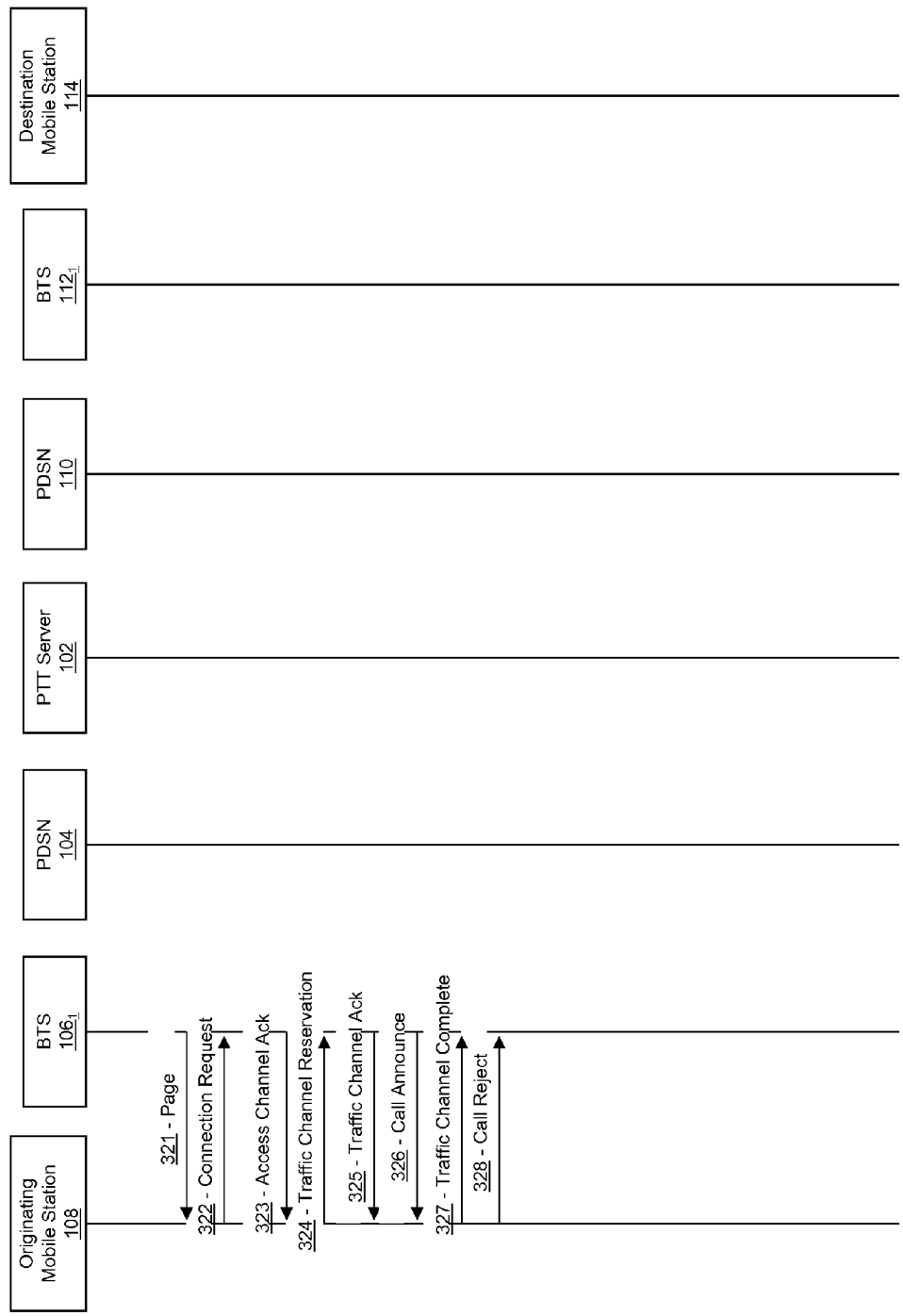

FIGS. 3A and 3B are conventional call flow diagrams of an unsuccessful push-to-talk call. The push-to-talk call flows of FIGS. 3A and 3B illustrate an unsuccessful push-to-talk call due to the originating mobile station not receiving a traffic channel. The call flow of an unsuccessful push-to-talk call is similar to that of a successful push-to-talk call, and only differences in the call flows will be described below. Accordingly, the first difference between a successful and unsuccessful call, is that in response to the access request (step 301) BTS 106₁ sends a traffic channel denied message to the originating mobile station (step 305). At this point the originating mobile station enters an idle state due to the failure to obtain a traffic channel.

Steps 302-320 are similar to steps 202-220 of the successful push-to-talk call flow. Upon receiving the status success message (step 320), BTS 106₁ recognizes that a traffic channel is not established with the originating mobile station 108, and accordingly sends a page message to establish the traffic channel (step 321). Originating mobile station 108 responds with a connection request message (step 322), and BTS 106₁ responds with an access channel acknowledgement message (step 323).

Originating mobile station 108 then sends a traffic channel reservation message (step 324), and BTS 106₁ then sends traffic channel acknowledgement and call announce messages (steps 325 and 326). Originating mobile station 108 sends a traffic channel complete message (step 327), but does not recognize that a push-to-talk call has been established, and sends a call reject message (step 328) in response to receipt of the call announce message. This message is forwarded to PTT server 102, which then deletes the information regarding the call from its cache. The entire processing of FIGS. 3A and 3B would be repeated for each subsequent attempt by the originating mobile station.

Using the conventional call processing illustrated in FIGS. 3A and 3B in the unsuccessful call scenario results in an unnecessary waste of network resources to send messages when the call will be rejected by the originating mobile station. This is due in large part to the PTT server 102 not being aware that the originating mobile station 108 never established a traffic channel. Accordingly, the conventional call flow processing for an unsuccessful push-to-talk call is particularly inefficient, and provides no mechanism for detecting a call failure at the originating mobile station.

Figure 4:
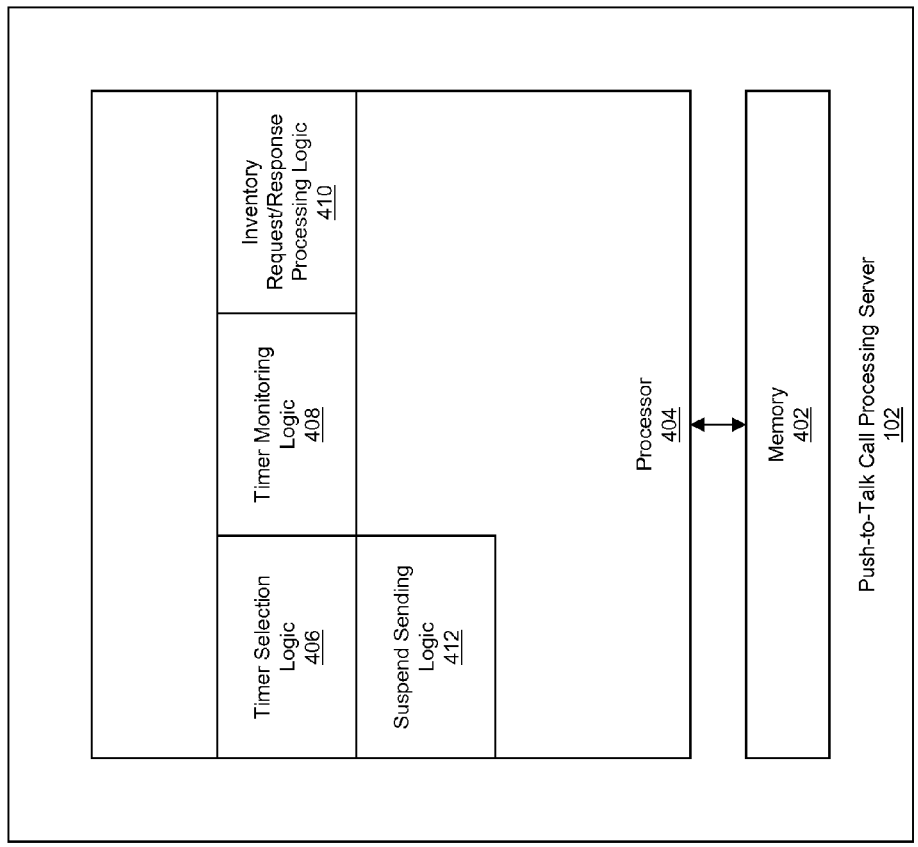
FIG. 4 is a block diagram of an exemplary push-to-talk call processing server in accordance with the present invention.

FIG. 4 is a block diagram of an exemplary push-to-talk call processing server in accordance with the present invention. The push-to-talk call processing server 102 includes memory 402 coupled to processor 404. Processor 404 includes logic 406-412, which will be described in more detail below in connection with FIGS. 5A-5C. Processor 404 can be any type of processor, such as a field programmable gate array (FPGA), application specific integrated circuit (ASIC) and/or a microprocessor. When processor 404 is a microprocessor, logic 406-412 can be computer readable code executed by the microprocessor, and loaded from a computer readable medium such a memory 402. Memory 402 can be any type of memory including random access memory (RAM), read-only memory (ROM), flash memory, a hard disk, a CD, and/or a DVD.

Figure 5A:
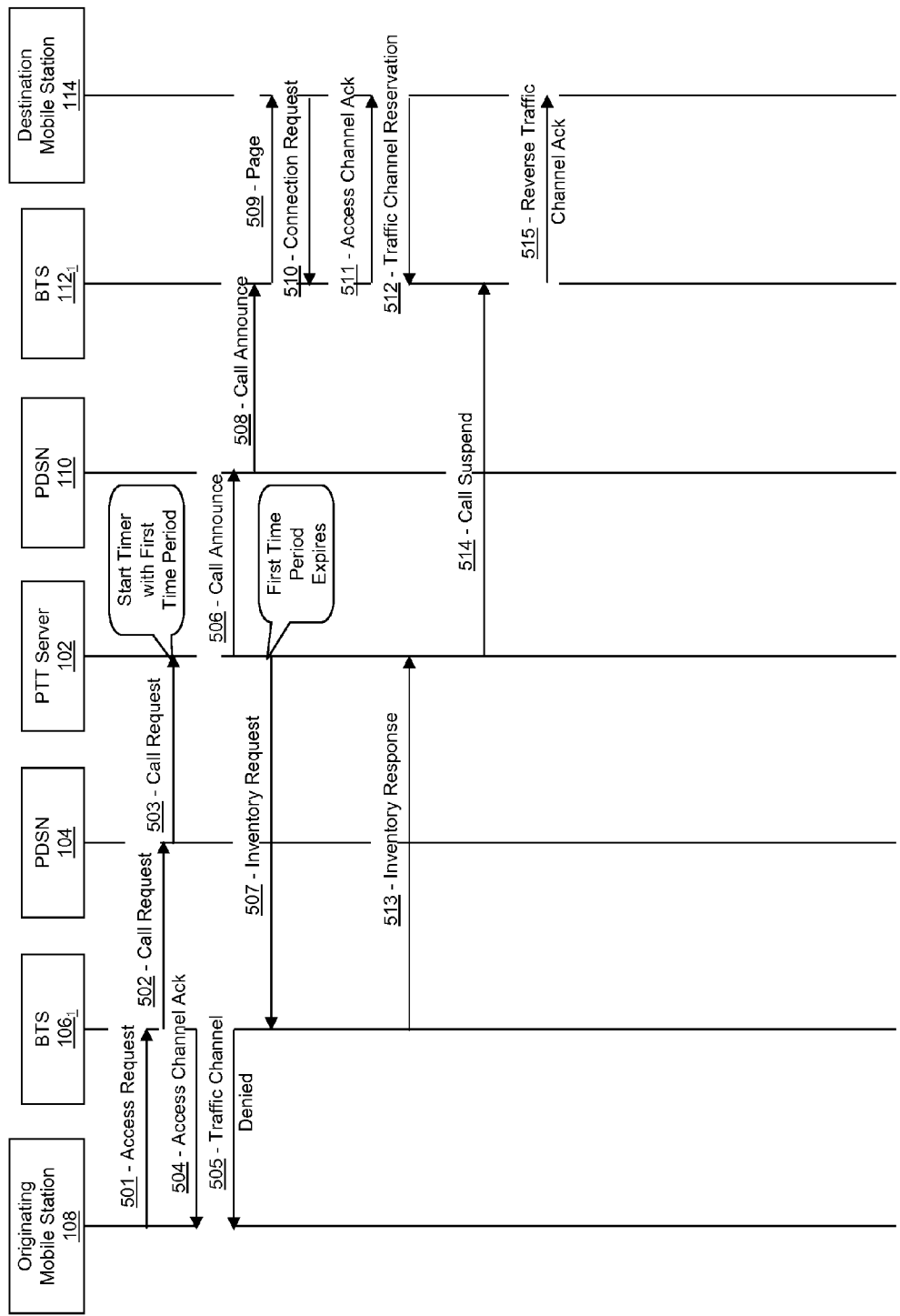
FIGS. 5A-5C are exemplary call flow diagrams of a method in accordance with the present invention.
Figure 5B:
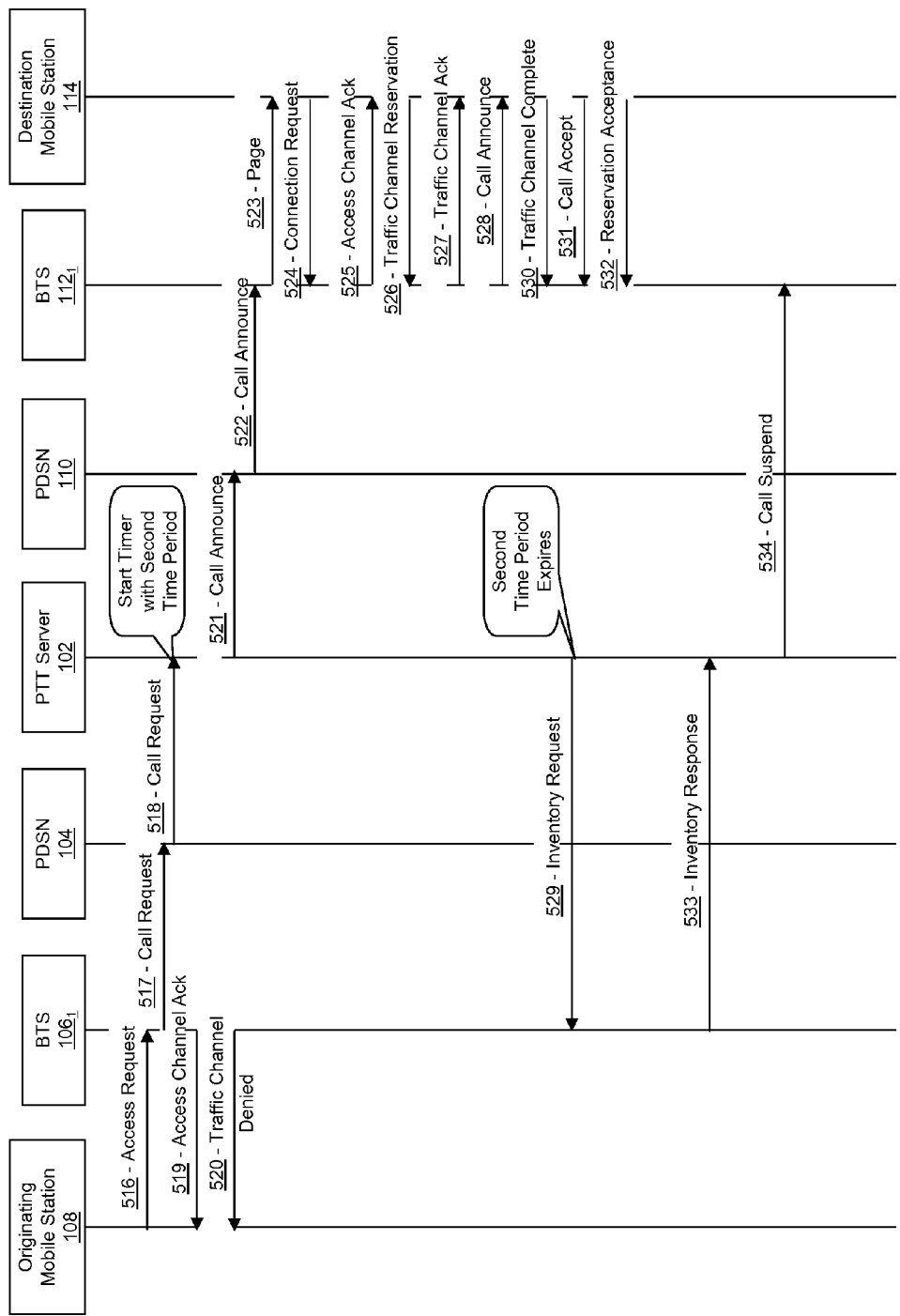
Figure 5C:
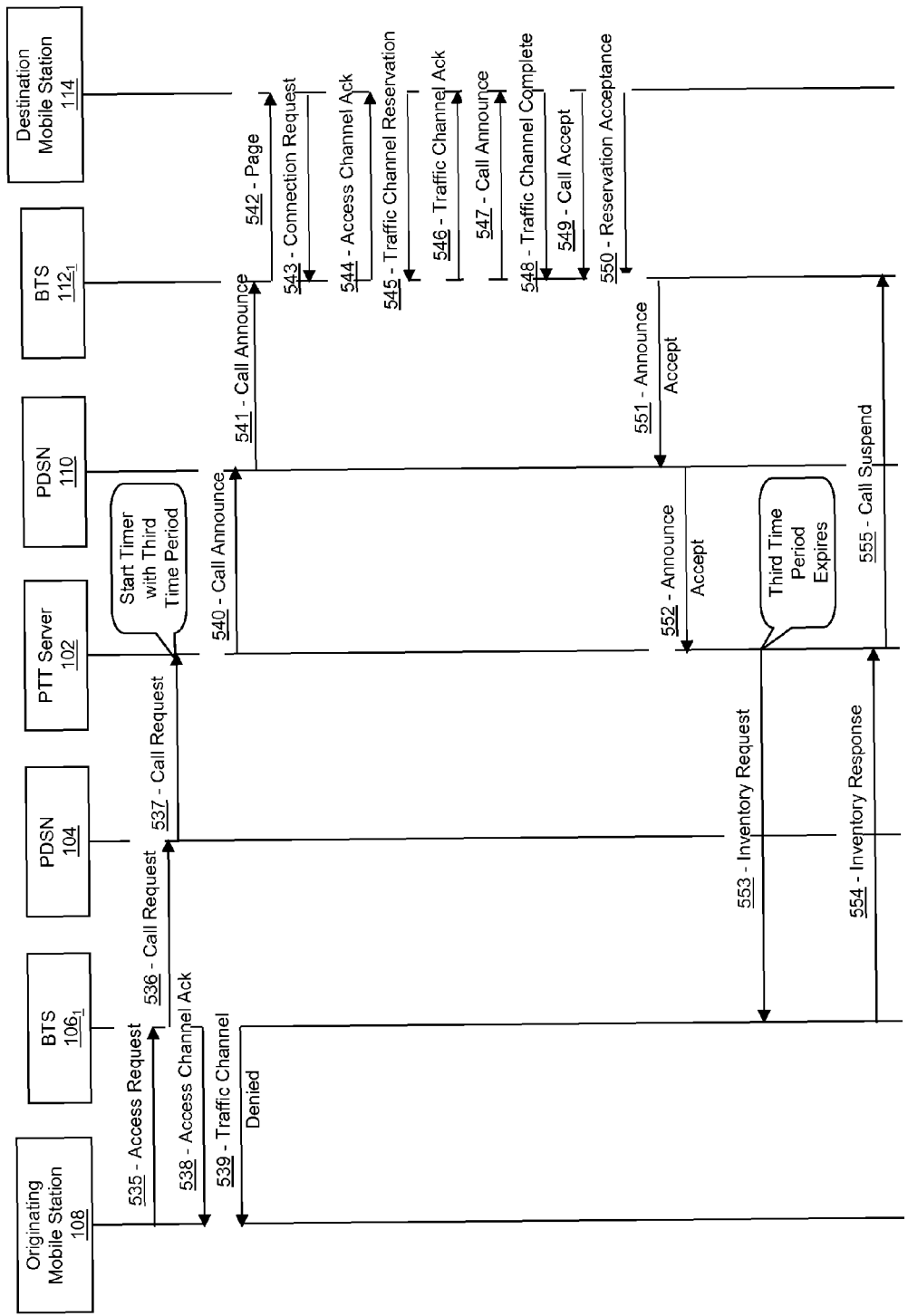

FIGS. 5A-5C are exemplary call flow diagrams of a method in accordance with the present invention. Exemplary embodiments of the present invention employ a timer in the PTT server 102, the expiration of which causes the server to send a message to the originating BTS requesting an identification of all recent call rejections or failures. Specifically, when PTT server 102 receives a call request message (step 503), logic 408 of server 102 starts a timer with a first time period, which is selected by logic 406. PTT server 102 continues to send the call announce message to PDSN 110, but upon expiration of the first time period logic 410 send an inventory request message to BTS 106₁ requesting an identification of any recent call rejections or failures with a predetermined period of time (step 507). BTS 106₁ sends a response to PTT server 102 (step 513), and logic 410 reviews the response message to identify whether the originating mobile station 108 identified in call request message of step 503 is included in the inventory response message. Because, in the call flow of FIG. 5A, the originating mobile station 108 receives a traffic channel denial message (step 505), the originating mobile station will be identified in the inventory response message. Accordingly, PTT server 102 sends a call suspend message to BTS 112₁ (step 514). BTS 112₁ then suspends further call processing in connection with the push-to-talk call identified in the call announce message sent in step 508. The call suspension message is sent early enough in the traffic channel establishment processing for destination mobile station 114 such that the destination mobile station does not output an indication of an incoming call.

Turning now to FIG. 5B, originating mobile station 108 again attempts to establish a traffic channel, but again is denied (step 520). PTT server 102 identifies that the call request message received in step 518 identifies the same originating mobile station from which it received a prior call request for which the originating mobile station was denied a traffic channel. Accordingly, logic 406 selects a second time period and logic 408 starts the timer with the second time period. The second time period is longer than the first time period, and accordingly the inventory request message sent after expiration of the second time period (step 529) occurs later in the call processing between BTS 112₁ and destination mobile station 114. However, PTT server 102, recognizing that the originating mobile station 108 is identified in the inventory response message (step 533), sends a call suspend message to BTS 112₁ (step 534). Accordingly, BTS 112₁ suspends further processing in connection with the push-to-talk call. In this case, the call suspension message is after destination mobile station 114 has output an indication of an incoming call because the traffic channel for the destination mobile station has been successfully established.

Turning now to FIG. 5C, when PTT server 102 receives a third call request message (step 537) from the originating mobile station 108 in connection with the same push-to-talk call, logic 406 selects the third time period and logic 408 starts the timer with the third time period. The third time period is longer than the first and second time periods, and accordingly the inventory request and response messages are exchanged after the PTT server 102 receives the announce acceptance message from PDSN 110. Thus, when PTT server 102 identifies that the originating mobile station 108 is included in the inventory response message of step 554, PTT server 102 sends a call suspend message to BTS 112₁ in order for the BTS to suspend the call (step 555). Again, because the traffic channel for destination mobile station 114 has been successfully established when BTS 112₁ receives the call suspend message, the destination mobile station 114 will have output an indication of an incoming call.

The processing described above in connection with FIGS. 5A-5C can be repeated after the third failure, such that the first time period is again employed for the fourth call attempt. Although the call flow of FIGS. 5A-5C have been described in connection with three call denials for the originating mobile station, it should be recognized that the originating mobile station may be able to obtain a traffic channel after the first or second call denial. As can be seen by comparing the processes of FIGS. 3A and 3B to that of FIGS. 5A-5C, using the timer of the present invention reduces network resources when an originating mobile station is not able to obtain a traffic channel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising the acts of:
receiving, by a push-to-talk server from an originating mobile station, a request for a push-to-talk call;
sending, by the push-to-talk server to a destination mobile station identified in the request, a push-to-talk call notification;
starting a timer in response to receipt of the request;
sending, upon expiration of the timer, an information request message from the push-to-talk server to a base transceiver station of the originating mobile station;
receiving an information response message at the push-to-talk server from the base transceiver station; and
determining by the push-to-talk server whether a traffic channel has been established with the originating mobile station for the push-to-talk call based on the information response message.

2. The method of claim 1, wherein the destination mobile station attempts to obtain a traffic channel in response to receipt of the push-to-talk call notification.

3. The method of claim 2, wherein when it is determined that the originating mobile station does not have a traffic channel, the method further comprises the act of:
sending a push-to-talk call suspension message to the destination mobile station.

4. The method of claim 3, wherein the timer is employed with at least a first and second time period, the first and second time periods being of a different duration, and the second time period being employed subsequent to the first time period.

5. The method of claim 4, wherein when it is determined that the originating mobile station does not have a traffic channel, the timer employs the second time period and another determination is performed upon expiration of the timer as to whether the originating mobile station has a traffic channel.

6. The method of claim 5, wherein during the first period of time the destination mobile station does not output an indication of an incoming push-to-talk call and during the second period of time the destination mobile station outputs an indication of an incoming push-to-talk call.

7. The method of claim 1, wherein the information response message identifies call rejections and failures that have occurred within a particular period of time.

8. The method of claim 7, wherein the particular period of time relates to a time of receipt of the request for the push-to-talk call.

9. A push-to-talk server, comprising:
a memory; and
a processor coupled to the memory, wherein the push-to-talk server receives a request for a push-to-talk call from an originating mobile station and sends a push-to-talk call notification to a destination mobile station identified in the request, and wherein the processor comprises
logic that starts a timer in response to receipt of the request;
logic that sends, upon expiration of the timer, an information request message to a base transceiver station of the originating mobile station;
logic that receives an information response message from the base transceiver station;
and
logic that determines whether a traffic channel has been established with the originating mobile station for the push-to-talk call based on the information response message.

10. The push-to-talk server of claim 9, wherein the destination mobile station attempts to obtain a traffic channel in response to receipt of the push-to-talk call notification.

11. The push-to-talk server of claim 10, wherein the processor further comprises:
logic that sends a push-to-talk call suspension message to the destination mobile station when it is determined that the originating mobile station does not have a traffic channel.

12. The push-to-talk server of claim 11, wherein the timer is employed with at least a first and second time period, the first and second time periods being of a different duration, and the second time period being employed subsequent to the first time period.

13. The push-to-talk server of claim 12, wherein when it is determined that the originating mobile station does not have a traffic channel, the timer employs the second time period and another determination is performed upon expiration of the timer as to whether the originating mobile station has a traffic channel.

14. The push-to-talk server of claim 13, wherein during the first period of time the destination mobile station does not output an indication of an incoming push-to-talk call and during the second period of time the destination mobile station outputs an indication of an incoming push-to-talk call.

15. The push-to-talk server of claim 9, wherein the information response message identifies call rejections and failures that have occurred within a particular period of time.

16. The push-to-talk server of claim 15, wherein the particular period of time relates to a time of receipt of the request for the push-to-talk call.

* * * * *